United States Patent
Ma

(10) Patent No.: US 10,974,340 B2
(45) Date of Patent: Apr. 13, 2021

(54) LASER METAL DEPOSITION WELDING PROCESS, PARTS FORMED THEREFROM AND USES IN OIL, GAS AND PETROCHEMICAL APPLICATIONS

(71) Applicant: ExxonMobil Research and Engineering Company, Annandale, NJ (US)

(72) Inventor: Ning Ma, Whitehouse Station, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 34 days.

(21) Appl. No.: 15/712,241

(22) Filed: Sep. 22, 2017

(65) Prior Publication Data
US 2018/0104759 A1 Apr. 19, 2018

Related U.S. Application Data

(60) Provisional application No. 62/408,977, filed on Oct. 17, 2016.

(51) Int. Cl.
| | | |
|---|---|---|
| B23K 9/095 | (2006.01) | |
| C08F 240/00 | (2006.01) | |
| B23P 6/00 | (2006.01) | |
| B23K 26/00 | (2014.01) | |
| B23K 101/10 | (2006.01) | |

(52) U.S. Cl.
CPC ........ *B23K 9/0953* (2013.01); *B23K 26/0006* (2013.01); *B23P 6/00* (2013.01); *C08F 240/00* (2013.01); *B23K 2101/10* (2018.08); *F17C 2209/221* (2013.01)

(58) Field of Classification Search
CPC .............. B23K 9/0953; B23K 26/0006; B23K 2101/10; C08F 240/00; B23P 6/00; F17C 2209/221
See application file for complete search history.

(56) References Cited

U.S. PATENT DOCUMENTS

2015/0273629 A1* 10/2015 Hanschmann ..... B23K 26/1476
403/272

FOREIGN PATENT DOCUMENTS

| CN | 2838759 Y | * 11/2006 |
| CN | 2838759 Y | 11/2006 |
| JP | 04162974 A | 6/1992 |

OTHER PUBLICATIONS

Larry Adams: "Joining Not Welding", FAB SHOP Magazine, Aug. 1, 2016, URL https://www.industrial-lasers.com/surface-treatment/article/16485094/laser-metal-deposition-defined (Year: 2016).*

(Continued)

*Primary Examiner* — Daniel J. Schleis
*Assistant Examiner* — Kevin Ct Li
(74) *Attorney, Agent, or Firm* — Robert A. Migliorini; Kristina Okafor

(57) ABSTRACT

Provided is an oil, gas and/or petrochemical ferrous or non-ferrous material component including two or more segments of ferrous or non-ferrous components for joining, wherein the two or more segments are of the same or different materials, and laser metal deposition weldments bonding adjacent segments of said components together. Also provided are methods of making laser metal deposition weldments and their uses in the oil, gas and petrochemical industry.

13 Claims, 7 Drawing Sheets

(56) References Cited

OTHER PUBLICATIONS

David Locke, et al.: "Laser metal deposition defined", Industrial Laser Solutions for Manufacturers, Jan. 11, 2010, Industrial Lasers; URL https://www.industrial-lasers.com/surface-treatment/article/16485094/laser-metal-deposition-defined (Year: 2010).*

S. Felber: "Welding of the High Grade Pipeline-Steel X80 and Description of Different Pipeline-Projects", May 2008, Welding in the World, vol. 52 Issue 5-6, pp. 19-41, URL https://rd.springer.com/article/10.1007/BF03266637 (Year: 2008).*

"Laser Metal Deposition Defined", published in Industrial Laser Solutions for Manufacturers, Jan. 11, 2010, URL https://www.industrial-lasers.com/surface-treatment/article/16485094/laser-metal-deposition-defined (Year: 2010).*

"Joining Not Welding", published in FAB SHOP Magazine, Aug. 1, 2016, URL https://fmsdirect.com/welding/laser-welding/330-joining-not-welding (Year: 2016).*

"Welding of the High Grade Pipeline-Steel X80 and Description of Different Pipeline-Projects", published in Welding in the World, vol. 52, Issue 5-6, pp. 19-41, 2008, URL https://rd.springer.com/article/10.1007/BF03266637 (Year: 2008).*

Mudge et al., "Laser Engineered Net Shaping Advances Additive Manufacturing and Repair", Welding Journal, Jan. 2007, pp. 44-48, American Welding Society.

Adams, "Joining Not Welding." FAB SHOP Magazine, retrieved from internet Jul. 18, 2018, http://www.fsmdirect.com/welding/laser-welding/330-joining-not-welding.

Locke et al., "Laser metal deposition defined", Industrial Laser Solutions, retrieved from internet Jul. 18, 2018, http://www.industrial-lasers.com/articles/print/volume-250/issue-6/features/laser-metal-deposition.html.

The International Search Report and Written Opinion of PCT/US2017/052873 dated Feb. 12, 2018.

Luo et al., "Effect of Laser Power on the Cladding Temperature Field and the Heat Affected Zone", J. of Iron and Steel Research, International (2011), vol. 18 No. 1, pp. 73-78.

Easterling (1992). Introduction to the Physical Metallurgy of Welding (2nd ed.). Butterworth-Heinemann., pp. 23-27, equation 1.18.

* cited by examiner

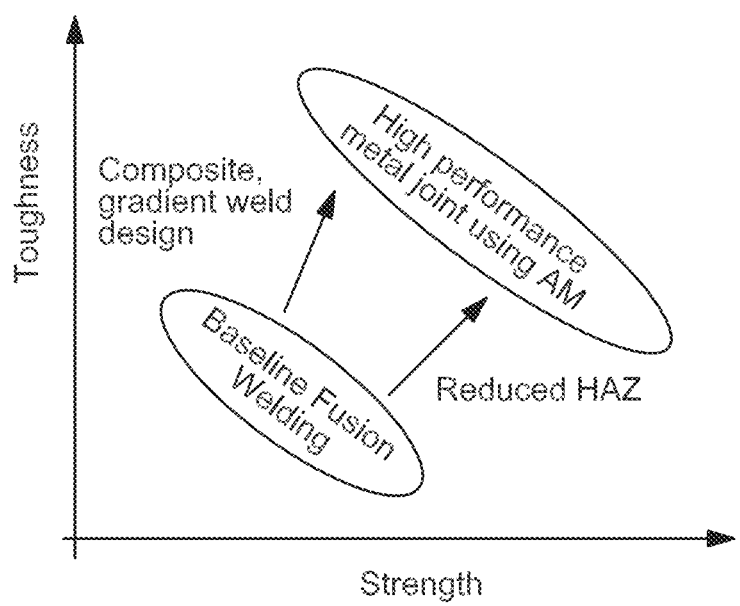
FIG. 1
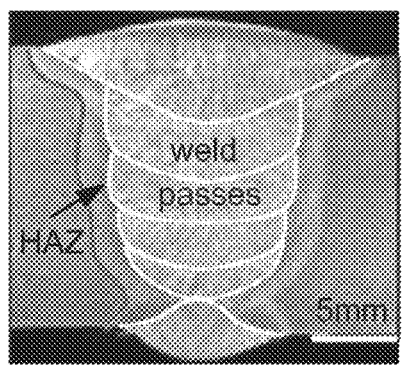 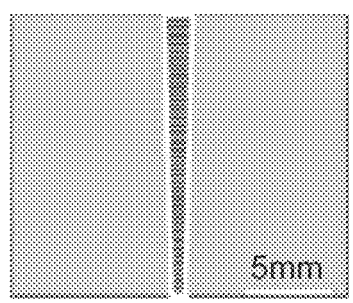
FIG. 2(a)      FIG. 2(b)

LASER METAL DEPOSITION WELDING PROCESS, PARTS FORMED THEREFROM AND USES IN OIL, GAS AND PETROCHEMICAL APPLICATIONS

CROSS-REFERENCE TO RELATED APPLICATIONS

This application claims the benefit of U.S. Provisional Application No. 62/408,977, filed on Oct. 17, 2016, the entire contents of which are incorporated herein by reference.

FIELD

The present disclosure relates to the field of welding for joining metal parts. It more particularly relates to a laser metal deposition process for joining metal parts wherein the weldment includes a composition gradient to provide advantageous properties. It also relates to the use of the laser metal deposition process in the oil, gas and petrochemical industry.

BACKGROUND

Welding is a process which two materials are permanently joined together through localized bonding, resulting from a suitable combination of temperature, pressure and metallurgical conditions. By far the most prevalent technique used in welding construction is arc or fusion welding. In fusion welding, the joints are made by melting the metal and welding consumable at the joint gap, so that upon solidification, the components are fused, or joined together. Fusion welding is classified according to the nature of heat source. An electric arc is used in gas metal arc welding, gas-tungsten arc welding and submerged arc welding. In electron beam welding, very high energy density beams are used as an energy source. Resistive heating is utilized in the electroslag welding process.

Fusion welding is used for the joining of metal parts such as formed shapes, forgings, castings, or plates to construct any number of structures or components for a variety of industries. For example, construction using pipes and tubes to form pipelines for oil, gas and geothermal wells and the like is largely performed by conventional arc or fusion welding. For decades, the pipeline industry has made wide use of several fusion welding technologies such as shielded metal arc welding (SMAW) and mechanized gas metal arc welding (GMAW) for pipeline construction. There have been considerable efforts for developing weld consumables and welding procedures that provide suitable properties of the weldment (e.g., overmatch, toughness).

In the fusion welding process, the larger the pipe diameter, or the thicker the wall of the pipe, the slower the welding becomes because a greater volume of metal must be melted and deposited in the weld joint. For onshore pipelines, particularly in remote areas, it is important that the welding be as economic as possible because of the large expense related to deployment of workers and equipment to the pipeline right of way (ROW). For offshore pipelines, it is important that the welding be as economic as possible because of the substantial costs associated with the laybarge. In welding and placing into service pipes for either onshore or offshore pipelines, there can be significant stresses resulting from many sources. For example, during laybarge operations, the completed pipeline hanging from the laybarge can produce large bending stresses. Pipelines may have to support ground movements in addition to containing the internal pressure. In addition, conventional fusion welded joints can suffer heat related damage that degrades the mechanical integrity of the joints. Examples of such attributes are tensile residual stress, hydrogen cracking, lack of fusion defects and low toughness.

Girth welds of linepipe steels using the well-established fusion welding processes typically consists of 3-20 passes of weld beads depending on the thickness of the pipe. During a standard onshore pipeline construction process, joining is accomplished by having about as many welding stations as there are number of weld passes, each station designed to produce one or two specific weld passes, which limits the welding speed. The entire process, therefore, requires considerable manpower and associated expenses to house them, particularly in remote locations and also time, which impacts pipeline construction costs.

In the case of high carbon content steels, such as casing steels that have a CE in the range of about 0.48 to 1.00, current welding practice requires preheating the work pieces to 100-400° C. and forming the weld with low hydrogen practices. Such procedures are necessary to minimize the formation of a hard HAZ and absorption of weld related hydrogen which cause susceptibility to cracking. Because of the difficulties associated with such a welding technique, often high carbon steel work pieces are mechanically joined instead using various types of couplings.

Conventional fusion welds can exhibit cracks in both the weld metal or in the HAZ, these cracks being created during welding or after some period of service. Hard and low toughness regions of the weldment, especially the HAZ, can be prone to develop cracks in service particularly when the welded component is used in sour service or other aggressive process environments. In the case of the petrochemical industry where thousands of miles of pipes are installed each year to transport gas, oil and fluids, the costs for repairs are significant. It is essential that these cracks are repaired before they grow to a critical dimension when they can propagate catastrophically.

In the fusion welding process, there are three distinct regions in the weldment: 1) fusion zone, also known as the weld metal, which undergoes melting and solidification, 2) the heat-affected zone (HAZ), which experiences significant thermal exposure but no melting and may undergo solid-state transformation and 3) the unaffected base metal. There are significant limitations with the fusion welding process.

One of these limitations is that the HAZ is the most common region of weld failures. While weld metal composition is variable, depending on welding consumable, the HAZ composition is the same as that of base metal. The HAZ has complex metallurgical reactions that can degrade the HAZ mechanical properties. HAZ usually has the lowest toughness in the entire joint. Given that the heat input is limited by the size and properties of HAZ, the welding productivity is physically bounded by the dimension of gaps to be joined, which has to fit the size of energy sources. Another limitation is that applying fusion welding to dissimilar or exotic metals is particularly challenging. Another limitation of fusion welding is the combination of high strength and toughness that can be achieved.

A need exists for an improved process for joining metal parts for improving weld reliability through reducing/practically eliminating HAZ while yielding composite weld metal design for step-out performance, and in particular, a combination of high strength and toughness. A need also exists for an improved process for joining metal parts for providing a gradient weld metal structure to connect dissimilar metallic pieces while also permitting a narrower groove between the parts being joined to improve productivity and reduce distortion after welding. A need also exists for an improved process for joining metal parts that allows for a single feedstock to join a variety of steels from carbon steel to stainless steel.

Definitions

For convenience, various structural steel and welding terms used in this specification and claims are defined below.

Acceptable weldment strength: Strength level that is consistently above that of the base steel.

Acceptable weldment toughness: A toughness of greater than 0.05 mm, as measured by the crack-tip opening displacement (CTOD) test at less than or equal to 0° C.

Additive manufacturing: A technique to make a three dimensional solid object by laying down successive layers of material and in contrast to the traditional processes, reduces waste by directly producing a product without retooling.

HAZ: Heat-affected-zone.

Heat-affected-zone: Base metal that is adjacent to the weld line and that was affected by the heat of welding.

Toughness: Resistance to fracture initiation and growth

Fatigue resistance: Resistance to fracture (crack initiation and propagation) under cyclic loading.

Yield strength: That strength corresponding to load support without permanent deformation.

CRA: Corrosion resistant alloys. A specially formulated material used for completion components likely to present corrosion problems. Corrosion-resistant alloys may be formulated for a wide range of aggressive conditions.

Fretting fatigue: Fretting involves contact between surfaces undergoing small cyclic relative tangential motion. Fretting fatigue resistance is resistance to fracture in a notched metal parts or metal parts with holes.

LMD: laser metal deposition

Laser metal deposition: An additive manufacturing (AM) process which uses a laser beam to form a melt pool on a metallic substrate, into which powder is fed. The powder melts to form a deposit that is fusion bonded to the substrate.

Functionally graded deposits: In the LMD process where two non-compatible materials, A and B, are joined by gradually changing the deposit chemistry, one layer at a time, from alloy A to alloy B.

Weld joint: A welded joint including the fused or thermo-mechanically altered metal and the base metal in the "near vicinity" of, but beyond the fused metal. The portion of the base metal that is considered within the "near vicinity" of the fused metal varies depending on factors known to those in the welding art.

Weldment: An assembly of component parts joined by welding.

Weldability: The feasibility of welding a particular metal or alloy. A number of factors affect weldability including chemistry, surface finish, heat-treating tendencies and the like.

Carbon equivalent: A parameter used to define weldability of steels and expressed by the formula $CE=C+Mn/6+(Cr+Mo+V)/5+(Ni+Cu)/15$ where all units are in weight percent.

Hydrogen cracking: Cracking that occurs in the weld subsequent to welding.

TMAZ: Thermo-mechanically affected zone.

Thermo-mechanically affected zone: Region of the joint that has experienced both temperature cycling and plastic deformation.

TMAZ-HZ: The hardest region in a weldment.

LNG: Liquefied natural gas. Gas, mainly methane, liquefied under atmospheric pressure and low temperature.

CNG: Compressed natural gas. Natural gas in high-pressure surface containers that is highly compressed (though not to the point of liquefaction).

PLNG: Pressurized liquefied natural gas. Gas, mainly methane, liquefied under moderate pressure and low temperature (higher temperature than LNG).

SCR: Steel catenary riser. A deepwater steel riser suspended in a single catenary from a platform and connected horizontally on the seabed.

TTR: Top tension riser. A riser on offshore oil rigs which is placed in tension to maintain even pressure on marine riser pipe.

Invar: An alloy of iron and nickel specifically designed to have low coefficient of thermal expansion Duplex: Steel consisting of two phases, specifically austenite and ferrite Trees: The assembly of valves, pipes, and fittings used to control the flow of oil and gas from a well.

BOP: Blow Out Preventer. The equipment installed at the wellhead to control pressures in the annular space between the casing and drill pipe or tubing during drilling, completion, and work over operations.

OCTG: Oil Country Tubular Goods. A term applied to casing, tubing, plain-end casing liners, pup joints, couplings, connectors and plain-end drill pipe.

Semi-submersibles: Mobile drilling platform with floats or pontoons submerged to give stability while operating. Used in deeper waters down to 360 meters or more. Kept in position by anchors or dynamic positioning.

Jack-up rigs: Mobile drilling platform with retractable legs used in shallow waters less than 100 meters deep.

TLP: Tension Leg Platform. A floating offshore structure held in position by a number of tension-maintaining cables anchored to seabed. Cables dampen wave action to keep platform stationary.

DDCV: Deep Draft Caisson Vessel. Deep draft surface piercing cylinder type of floater, particularly well adapted to deepwater, which accommodates drilling, top tensioned risers and dry completions.

Compliant towers: Narrow, flexible towers and a piled foundation supporting a conventional deck for drilling and production operations. Designed to sustain significant lateral deflections and forces, and are typically used in water depths ranging from 1,500 to 3,000 feet (450 to 900 m).

FPSO: Floating Production Storage and Offloading vessel. A converted or custom-built ship-shaped floater, employed to process oil and gas and for temporary storage of the oil prior to transshipment.

FSO: Floating Storage and Offloading vessel. A floating storage device, usually for oil, commonly used where it is not possible or efficient to lay a pipe-line to the shore. The production platform will transfer the oil to the FSO where it will be stored until a tanker arrives and connects to the FSO to offload it Tendons: Tubular tethers that permanently moor a floating platform attached at each of the structure's corners.

Umbilicals: An assembly of hydraulic hoses which can also include electrical cables or optic fibers, used to control a subsea structure or ROV from a platform or a vessel.

Tender vessels: A support/supply ship for carrying passengers and supplies to and from facilities close to shore.

SUMMARY

According to the present disclosure, an advantageous oil, gas and/or petrochemical ferrous or non-ferrous material component comprising: two or more segments of ferrous or non-ferrous components for joining, wherein the two or more segments are of the same or different materials, and laser metal deposition weldments bonding adjacent segments of said components together.

Another aspect of the present disclosure relates to an advantageous method for welding two pieces of metal to produce a laser metal deposition weld joint having a specific property or set of properties chosen for an intended application, the method comprising: obtaining a data base of weld properties for weld joints formed by LMD under a plurality of conditions and from various metal compositions; correlating the weld conditions and metal compositions to the weld properties; selecting weld conditions from the data base that will produce a weld joint having the property or set of properties best suited to the intended application; subjecting the work pieces to LMD under the conditions selected, and wherein the work pieces subjected to LMD are of the same or different materials.

A further aspect of the present disclosure relates to an advantageous method for welding metal parts and repairing cracks in metal parts by subjecting the faying surfaces of the metal parts to be welded to laser metal deposition and the cracks to be repaired to laser metal deposition under conditions sufficient to provide a weld joint or crack repair having a preselected property or set of properties based on the intended use of the weldment, wherein the metal parts to be welded are of the same or different materials.

These and other features and attributes of the disclosed processes for joining metal parts using laser metal deposition and metal parts have a weld seam having a laser metal deposition layer their advantageous applications and/or uses will be apparent from the detailed description which follows, particularly when read in conjunction with the figures appended hereto.

BRIEF DESCRIPTION OF DRAWINGS

To assist those of ordinary skill in the relevant art in making and using the subject matter hereof, reference is made to the appended drawings, wherein:

FIG. 1 depicts an exemplary schematic of approaches for improving metal joint performance.

FIG. 2(a) depicts a prior art typical fusion weld of a ¾" thick line pipe steel.

FIG. 2(b) depicts an exemplary laser metal deposition (LMD) weld of the present disclosure.

DETAILED DESCRIPTION

Figure 3:
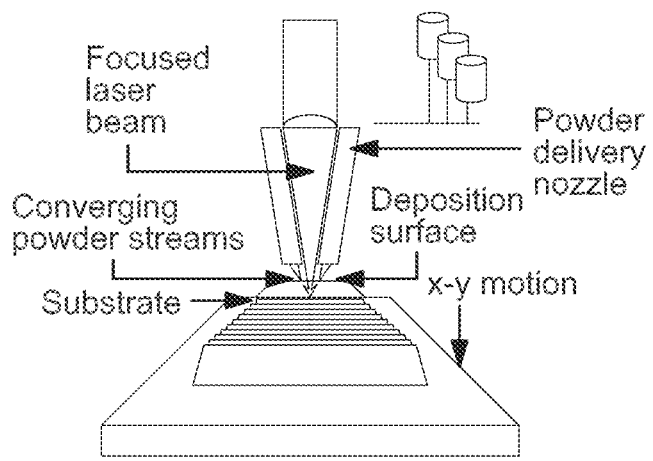
FIG. 3 depicts an exemplary schematic of the method for forming a laser metal deposition weld of the present disclosure.

All numerical values within the detailed description and the claims herein are modified by "about" or "approximately" the indicated value, and take into account experimental error and variations that would be expected by a person having ordinary skill in the art.

The present disclosure provides novel metal parts including a weldment formed by a laser metal deposition process and a novel method for joining such metal parts using the LMD process to provide advantageous properties and uses in novel applications in the oil, gas and petrochemical industry. More particularly, the present disclosure utilizing the inventive LMD process produces metal welds with improved mechanical properties and reliability. The application includes, but is not limited to, infrastructure fabrication under extreme environments, such as arctic region.

In one exemplary embodiment of the present disclosure, an oil, gas and/or petrochemical ferrous or non-ferrous material component is disclosed that includes: two or more segments of ferrous or non-ferrous components for joining, wherein the two or more segments are of the same or different materials, and laser metal deposition weldments bonding adjacent segments of said components together.

In another exemplary embodiment of the present disclosure, a method for welding metal parts and repairing cracks in metal parts is disclosed that includes subjecting the faying surfaces of the metal parts to be welded to laser metal deposition and the cracks to be repaired to laser metal deposition under conditions sufficient to provide a weld joint or crack repair having a preselected property or set of properties based on the intended use of the weldment, and wherein the metal parts to be welded are of the same or different materials.

In yet another exemplary embodiment of the present disclosure, a method for welding two pieces of metal to produce a laser metal deposition weld joint having a specific property or set of properties chosen for an intended application is disclosed. The method includes the steps of: obtaining a data base of weld properties for weld joints formed by LMD under a plurality of conditions and from various metal compositions; correlating the weld conditions and metal compositions to the weld properties; selecting weld conditions from the data base that will produce a weld joint having the property or set of properties best suited to the intended application; subjecting the work pieces to LMD under the conditions selected, and wherein the work pieces subjected to LMD are of the same or different materials.

The potential metallurgical approaches to enhance the metal weld are shown in FIG. 1. One such approach is through novel weld metal structure design and HAZ size reduction.

Referring to FIG. 2a is shown the typical HAZ of a prior art fusion weldment joining a ¾" thick line pipe steel. In comparison, FIG. 2b is shown an inventive LMD weldment joining a ¾" thick line pipe steel. Comparing FIGS. 2a and 2b, the inventive LMD weldment exhibits reduced and almost no HAZ compared to the prior art fusion weldment. The size of the HAZ is directly related to that of melt pool. Compared with fusion welding, the size of the melt pool using the inventive LMD process may be as small as 0.005 inch, which translates to a HAZ of 0.01 in. or less, or 0.0075 or less, or 0.005 or less, or 0.0025 or less. Using the inventive LMD process, an input energy variation approach may be also adopted to further reduce the size of HAZ to 0.001 or less. With the input energy variation approach, low energy mode is selected at the boundary between weld metal and base metal. Then, the input energy is gradually tuned up to reach the production level. An additional benefit of the small deposit used in the inventive LMD process is minimal distortion of the LMD weldment.

The inventive LMD weldment also allows for a vastly narrower groove in terms of the gap between the working metal pieces for joining. This may also be referred to as ultra-narrow groove design. The gap between the metal pieces for joining may be less than or equal to 5 mm, or less than or equal to 4 mm, or less than or equal to 3 mm, or less than or equal to 2 mm, or less than or equal to 1 mm with the inventive LMD weldment and process for making therein.

The LMD weldment, parts including a LMD weldment and process of making a LMD weldment disclosed herein is distinguishable over the prior art in providing the following non-limiting advantages and attributes, which, inter alia, include one or more of the following: 1) optimum weld reliability through reducing/practically eliminating the HAZ, 2) the ability to produce a composite "layered" weld metal design for step-out performance in terms of an improved combination of strength and toughness properties, 3) the ability to use a gradient weld metal structure to connect dissimilar metallic pieces, 4) the ability to fabricate a narrower weldment groove to improve productivity and reduce distortion after welding, and 5) the ability to utilize a single feedstock to join a variety of steels from carbon steel to stainless steel.

Referring to FIG. 3, depicted is the laser metal deposition process (LMD) of the instant disclosure. The process utilizes a laser beam to form a melt pool on a metallic substrate for joining or repair, into which a powder stream is fed. Both laser beam and powder steam may be delivered remotely using the inventive LMD process. In an alternative approach, plasma spray deposition may be utilized instead of LMD. The LMD process of the instant disclosure continues with the step of melting with a laser beam the powder between two metallic parts for joining to provide an LMD weldment. Preferably, a shielding gas, such as of carbon dioxide and/or argon, is used during the melting step to protect the area from atmospheric gases that could compromise the quality of the LMD weldment. Preferably, the laser beam, the powder and the shielding gas are all simultaneously emitted from a single LMD head. This LMD head may be moved relative to the seam between the two metals parts for joining or vice versa until the LMD weldment is formed. Depending, among other things, on the diameter of the laser beam emitted by the LMD head, more than multiple passes of the LMD head may be required to apply the LMD layer to the entire depth of the seam to form the LMD weldment. The LMD head may travel along the seam for welding through multiple passes in a lengthwise direction or it may travel along the seam for welding in a zig-zag pattern to form the LMD weldment to the seam. The power of the laser beam may be controlled to adjust the depth of the LMD weldment. Alternatively, the above described process may be utilized to repair an existing fusion weld or friction stir weld by forming an LMD layer onto an existing weld seam. The thickness of the repair layer may be adjusted by controlling the power to the beam. Using the above described inventive process, the heat affected zone (HAZ) from the LMD process may be minimized.

The groove design of the inventive LMD process is also not limited by energy source in the present invention. The powder feed stream melts to form a deposit that is fusion bonded to the substrate. The deposition substrate or "target" is aligned to the desired start point of the deposit. One or more powder feeders provides the powder to the powder delivery nozzle assembly, which creates a powder stream that converges at the point of the deposit. A laser then provides a focused beam that is delivered to the point of deposit, which melts the surface of the target and generates a small molten pool of base material. Powder that is being delivered to this same spot is absorbed into the melt pool, thus generating a deposit that may range in thickness from 0.005 to 0.040 inch, or 0.010 to 0.035 inch, or 0.015 to 0.030 inch, or 0.020 to 0.025 inch. The deposit may range in width from 0.040 to 0.160 inch, or 0.060 to 0.140 inch, or 0.080 to 0.120 inch, or 0.090 to 0.110 inch.

Motion control for the deposit may be programmed manually or may be generated from CAD files that are processed by the system's software. Using motion control for the deposit build, the powder stream fed to the process may be varied in the x, y and z directions to build a 3-dimensional LMD weldment.

The deposits may be made in a controlled argon atmosphere or other inert gas atmosphere containing less than 10 ppm oxygen, or less than 5 ppm oxygen, or less than 2 ppm oxygen. Some cladding work may also be performed utilizing a shielding gas system similar to the gas metal arc welding process.

Parameters for the low side are laser power of 400 to 500 Watts with a 1-mm spot size, deposition rates less than 1 in.$^3$/h and powder utilization rates less than 20%. Parameters for the high side are laser power of 2500 to 3000 W with a 3 to 4 mm spot size, deposition rates up to 14 in.$^3$/h, and powder utilization rates up to 80%.

Non-limiting exemplary powders that may be used in the LMD process include stainless steels (SAE grade 304, 316, 410, 420, 17-4PH), tool steels (H13), nickel alloys (Inconel 617, 625, 718), cobalt alloys (#6 Stellite, #21 Stellite), titanium alloys (ASTM grade Ti-6-4, Ti-6-2-4-2), hardfacing or cladding alloys, aluminum alloys, copper alloys, tantalum, tungsten, rhenium, molybdenum alloys, ceramics, carbides and functionally graded deposits.

The LMD process may utilize a lamp-pumped Nd:Yag laser, a fiber laser or a $CO_2$ laser. An Nd:Yag laser and a fiber laser both have wavelengths that are ~1 micron long. The optical absorption for the Nd:Yag and fiber laser beams is much higher than that of the $CO_2$ laser beam, whose wavelength is 10 microns. The higher absorption percentage for the Nd:Yag and fiber laser translates to a lower overall energy required to perform a comparable laser deposit. Typically, the Nd:Yag and fiber lasers require only one-half the wattage of a $CO_2$ laser to achieve the same deposition rates and hence are preferable in the LMD process. Moreover, the Nd:Yag and fiber laser beams may also be delivered using fiber optics, whereas the $CO_2$ beam must be delivered via reflective mirrors. This means the component being processed must be manipulated and moved under the stationary $CO_2$ beam. This may still be the case for the Nd:Yag and fiber lasers, but their delivery fibers also have the ability to be manipulated as part of the motion control system, which provides increased application flexibility, Lastly, with regard to the laser power source, the $CO_2$ laser requires the most floor space and the most energy. In contrast, the lamp pumped Nd:Yag requires less floor space and less energy compared to the $CO_2$ laser while the fiber laser requires the least floor space and the least energy and may also provide the highest quality laser beam.

Deposits formed utilizing the LMD process are metallurgically bonded and exhibit heat-affected zone (HAZ) and dilution zones ranging in thickness from 0.005 to 0.025 in., or from 0.010 to 0.020 in., or from 0.013 to 0.017 in. The LMD deposits exhibit low heat input and minimal distortion, Due to the small melt pool and high travel speeds characteristic of the LMD process, the deposits cool very fast (up to 10,000° C./s), which generates very fine grain structures that may be one order of magnitude smaller in size than comparable wrought products. Mechanical properties and the quality of the deposits are typically better than castings and approach properties of wrought products and for certain materials (like titanium) may exceed typical handbook values. The quality of the deposits produced using the LMD process are far superior to the fusion welding process.

In the present invention, weld metal can be fabricated as a composite metal fiber basket with any combination of metal fiber size, composition and connection. An example of composite weld design is schematically shown in FIG. 2b. A horizontally layered weld metal that may be varied in composition on a layer by layer basis is fabricated to provide maximum resistance to opening force along the horizontal direction. By choice, two different metal compositions were used for the layers. One composition may offer ductile behavior and the other layer may provide strength. By alternating the metal layers with different thickness or different frequency, an optimum combination of strength and toughness may be achieved for the inventive LMD weldment. The inventive LMD process is also capable of joining two non-compatible materials or parts (for example non-compatible materials A and B) for joining by gradually changing the deposit composition one layer at a time from alloy A to alloy B. Non-compatible materials or parts are typically parts made of significantly different materials. Using this "layering approach" for building the inventive LMD weldment, an infinite number of weldment designs may be achieved depending on the parts for joining and the desired characteristics and properties of the LMD weldment.

Using the inventive LMD process, the same welding setup and metal powders may be used to join a variety of materials including, but not limited to, carbon steel of various strengths, stainless steels and nickel based alloys. In contrast, one welding wire is designed to for a very specific material in traditional fusion welding. By simplifying the welding consumable feedstock, system cost may also be potentially reduced with the inventive LMD process.

Applications:

The LMD methods and parts including an LMD weldment of the present disclosure described herein may be utilized in the following non-limiting types of applications and uses. Applications of the LMD process include, but are not limited to, joining of similar metals, joining of dissimilar metals, the repair of worn components, performing near net shape freedom builds directly from CAD file, and the cladding of materials.

In one aspect, the LMD methods disclosed herein are useful in welding and repairing cast irons and carbon steel components used structural applications. In another aspect the LMD welding methods disclosed herein are useful in welding and repairing structural steels. These structural steels may be linepipe steels used in the oil and gas industry, including, but not limited to, API (American Petroleum Institute) Pipe Specification 5L pipe grades chosen from X50, X52, X60, X65, X70, X80, X90, X100 and X120 or higher strength steel. The wall thickness of the pipe may range from 3.2 mm to 38.1 mm, or 6.4 mm to 31.8 mm, or 12.7 to 25.4 mm, or 25.5 to 50 mm.

In yet another aspect, the LMD methods disclosed herein are particularly useful in welding and repairing plain carbon and alloy steels. Exemplary, but not limiting, plain carbon and alloy steels include, AISI 1010, 1020, 1040, 1080, 1095, A36, A516, A440, A633, A656, 4063, 4340, 6150 and other AISI grades, including high strength grades. Other exemplary carbon low alloy steels include ASTM grades A285, A387, A515, A516, A517 and other ASTM grades of carbon low alloy steels.

The LMD methods disclosed herein may be used to form welds, for example as spot welds, butt welds and T-joints, as well as to repair weld areas. More particularly, the LMD methods may be used to join and repair/treat respectively structures and structural steel components associated with the oil and gas industry. The joining via LMD may be performed either in a manufacturing facility such as a steel mill where the components are made or in the field of fabrication where the components (such as pipelines) are assembled. The repair and treatment via LMD may be made in the field. The resultant structures exhibit superior strength and toughness, and in many instances, may be joined and repaired/treated at a lower cost.

The steel structures and methods of making such steel structures disclosed herein are suitable for forming and repairing/treating structures in oil and gas exploration, production and refining applications. LMD is particularly advantageous for forming spot welds and butt welds of tubular structural steel components in these types of applications.

Exemplary, but non-limiting, steel structures in the oil and gas exploration, production, refining industry where the LMD methods of making disclosed herein find application are pipeline weld areas, steel catenary risers (SCR) and top tensioned risers (TTR) weld areas, threaded components, oil drilling equipment weld areas (i.e. two sections of a deep water oil drill string), liquefied natural gas (LNG) and pressurized LNG (PLNG) container weld areas, riser/casing joints, and well head equipment.

In oil and gas upstream applications, the methods of making steel structures disclosed herein are suitable for joining and repairing structures and components used in natural gas transportation and storage type applications. In particular, the methods of making steel structures disclosed herein may be utilized to enable gas transportation technologies ranging from pipelines, compressed natural gas (CNG), pressurized liquefied natural gas (PLNG), liquefied natural gas (LNG) and other storage/transportation technologies. In one form in natural gas transportation and storage type applications, the methods of making steel structures disclosed herein may be used for the joining/processing of pipelines, flow lines, gathering lines, expansion loops, and other transmission lines. In another form in natural gas transportation and storage type applications, the methods of making steel structures disclosed herein disclosed herein may be used for joining/processing of materials made of carbon steels, and structural steels. In yet another form in natural gas transportation and storage type applications, the methods of making steel structures disclosed herein may be used for the joining/processing of LNG, CNG, and PLNG storage and/or transportation structures. This includes modular LNG structures, shipping vessels, transferring components and pipelines, and related technologies.

In oil and gas exploration and production applications, the LMD methods of joining steel structures disclosed herein also may be utilized for joining and repairing various structures used for oil and gas well completion and production. These structures include, but are not limited to, offshore and onshore production structures, oil pipelines, oil storage tanks, casing/tubing, completion and production components, cast structure to flow line connections, subsea components, downhole tubular products (e.g. OCTG), topsides and related structures, umbilicals, tender and supply vessels, and flare towers. More particularly, exemplary offshore production structures include jacketed platforms, mobile offshore drilling units and related production components like casings, tendons, risers, and subsea facilities. Mobile offshore drilling units include, but are not limited to, semi-submersibles and jack-up rigs, tension leg platforms (TLPs), deep draft caisson vessels (DDCVs), compliant towers, floating production, storage and offloading (FPSO) vessels, floating storage and offloading (FSO) vessels, ships, tankers and the like. Exemplary subsea components include, but are not limited to, manifold systems, trees, and BOPs. Exemplary topsides and related structures include deck superstructures, drilling rigs, living quarters, helidecks, and related structures. It should be understood that LMD methods disclosed herein may be used to form the welds comprising such structures and components and the LMD methods disclosed herein may be used to repair and coat the welds or joints comprising such structures.

In downstream applications, the methods of making steel structures disclosed herein are suitable for joining and repairing structures and components used in refining and chemical plants. The steel structures and methods of making such steel structures disclosed herein provide advantages in the refining and chemicals plant applications through, inter alia, repair of components/structures, dissimilar metal joining, joining of steel structures and joining of difficult to weld materials, such as cast iron. These applications include, but are not limited to, cast iron, heat exchanger tubes and low and high-temperature process and pressure vessels. Exemplary low and high-temperature process and pressure vessels include steam cracker tubes, steam reforming tubes, and refinery structures and components. Exemplary materials suitable for the disclosed LMD technology include such corrosion resistant materials as 13% Cr steel grades, duplex stainless steel and superduplex stainless steel.

PCT/EP Clauses:

1. An oil, gas and/or petrochemical ferrous or non-ferrous material component comprising: two or more segments of ferrous or non-ferrous components for joining, wherein the two or more segments are of the same or different materials, and laser metal deposition weldments bonding adjacent segments of said components together.

2. The component of clause 1 wherein said ferrous or non-ferrous component is a plain carbon steel, a cast iron, a low alloy steel, a high carbon steel having a CE equal to or greater than 0.48, a titanium alloy, a nickel based alloy, cobalt based alloy, iron-nickel alloy, duplex stainless steel or combinations thereof.

3. The component of clauses 1-2 wherein the laser metal deposition conditions include laser type, metal powder type, shielding gas type, shielding gas flow rate, laser power, laser spot size and deposition rate, and wherein the metal powder type is selected from the group consisting of stainless steels, tool steels, nickel alloys, cobalt alloys, titanium alloys, hardfacing or cladding alloys, aluminum alloys, copper alloys, tantalum, tungsten, rhenium, molybdenum alloys functionally graded deposits, ceramics, carbides and combinations thereof.

4. The component of clauses 1-3 chosen from high strength pipelines, steel catenary risers, top tension risers, threaded components, liquefied natural gas containers, pressurized liquefied natural gas containers, deep water oil drill strings, riser/casing joints, and well-head equipment.

5. The component of clauses 1-4 wherein said component is used in natural gas transportation and storage type structures and components.

6. The component of clause 5 wherein said natural gas transportation and storage type structures and components are chosen from pipelines, flow lines, gathering lines, transmission lines, shipping vessels, transferring components, storage tanks, and expansion loops.

7. The component of clause 6 wherein said natural gas is in the form of LNG, CNG, or PLNG.

8. The component of clauses 1-4 wherein said component is used in oil and gas well completion and production structures and components.

9. The component of clause 8 wherein said oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

10. The component of clause 9 wherein said off-shore production structures/components are chosen from jacketed platforms, mobile offshore drilling units, casings, tendons, risers, subsea facilities, semi-submersibles, jack-up rigs, TLPs, DDCVs, compliant towers, FPSO, FSO, ships, and tankers.

11. The component of clause 10 wherein said subsea components are chosen from duplexes, manifold systems, trees and BOPs.

12. The component of clauses 1-4 wherein said component is used in oil and gas refinery and chemical plant structures and components.

13. The component of clause 12 wherein said oil and gas refinery and chemical plant structures and components are chosen from cast iron components, heat exchanger tubes, and low and high temperature process and pressure vessels.

14. The component of clause 13 wherein said low and high temperature process and pressure vessels are chosen from steam cracker tubes, and steam reforming tubes.

15. A method for welding metal parts and repairing cracks in metal parts by subjecting the faying surfaces of the metal parts to be welded to laser metal deposition and the cracks to be repaired to laser metal deposition under conditions sufficient to provide a weld joint or crack repair having a preselected property or set of properties based on the intended use of the weldment, wherein the metal parts to be welded are of the same or different materials.

16. The method of clause 15 wherein the preselected property or set of properties is selected from the group consisting of toughness, hardness, strength, fatigue, grain size, HAZ size, deposit width, and residual stress.

17. The method of clauses 15-16 wherein the conditions sufficient to provide the weld joint or crack repair are selected from at least one of laser type, metal powder type, shielding gas type, shielding gas flow rate, laser power, laser spot size and deposition rate used to affect the weld or repair and wherein the metal powder type is selected from the group consisting of stainless steels, tool steels, nickel alloys, cobalt alloys, titanium alloys, hardfacing or cladding alloys, aluminum alloys, copper alloys, tantalum, tungsten, rhenium, molybdenum alloys functionally graded deposits, ceramics, carbides and combinations thereof.

18. The method of clause 17 wherein the condition sufficient to provide a weld joint having a preselected property or set of properties includes utilizing one or more metal powders of preselected chemistry between the faying surfaces of the metal parts to be welded before subjecting them to LMD.

19. The method of clause 17 wherein the metal parts are ferrous metal parts of the same composition.

20. The method of clause 18 wherein the metal powder and metal parts are ferrous metal parts of the same composition.

21. The method of clause 19 wherein the ferrous metal has a CE equal to or greater than 0.48.

22. The method of clause 21 wherein the ferrous metal has a CE of about 0.94.

23. A method for welding two pieces of metal to produce a laser metal deposition weld joint having a specific property or set of properties chosen for an intended application, the method comprising: obtaining a data base of weld properties for weld joints formed by LMD under a plurality of conditions and from various metal compositions; correlating the weld conditions and metal compositions to the weld properties; selecting weld conditions from the data base that will produce a weld joint having the property or set of properties best suited to the intended application; subjecting the work pieces to LMD under the conditions selected, and wherein the work pieces subjected to LMD are of the same or different materials.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

EXAMPLES

The embodiments described above, in addition to other embodiments, can be further understood with reference to the following example:

Example 1

This example illustrates a joint with a combination of high strength and toughness, fabricated by LMD.

The plate to be joined was a 0.75 inches thick X52 HSLA steel with a dual-phase ferrite and pearlite microstructure. A v-shaped notch was pre-machined into the plate, 0.5 inches in depth and with a 45 degree chamfer, to simulate a joining gap. The LDM equipment was a standard powder fed laser metal deposition system available from RPM Innovation, Inc. The system was equipped with multi powder feeding nozzles. Two separate nozzles were used to deliver Type 304L stainless steel and H13 tool steel powders without cross contamination. The v-shaped notch was filled up by metal layers, altering each layer between Type 304L stainless steel and H13 tool steel.

Figure 4:
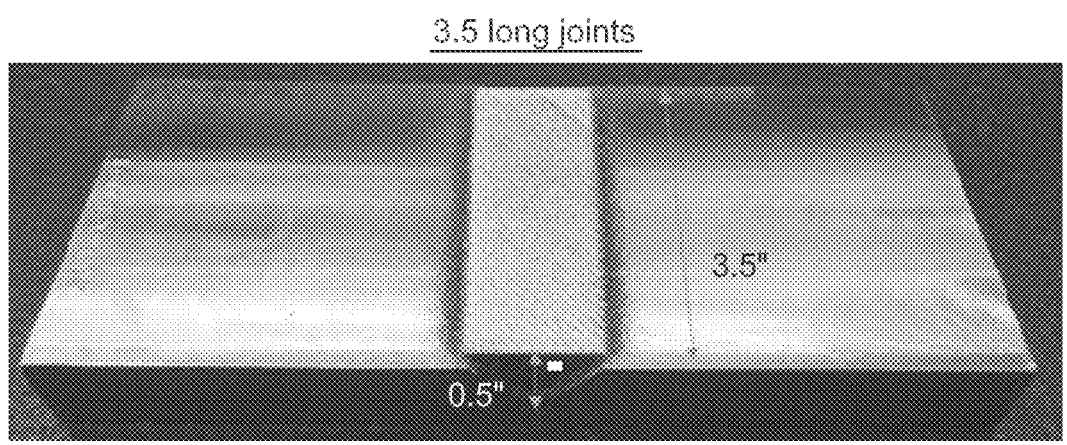
FIG. 4 depicts a fabricated 3.5 inch long additive joint on an X52 high-strength low-alloy (HSLA) steel plate.
Figure 5:
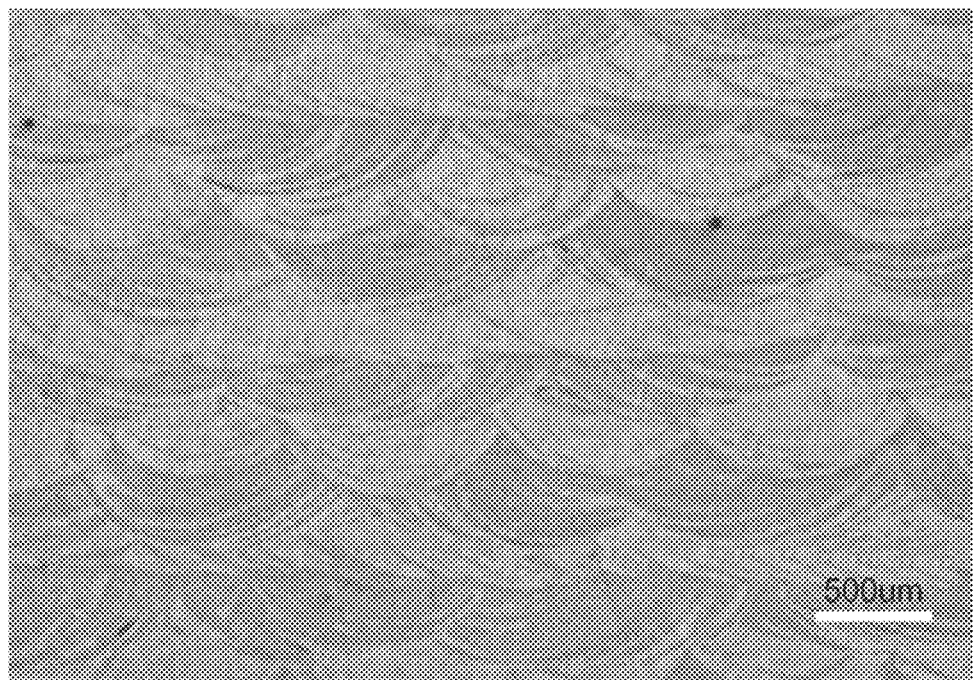
FIG. 5 depicts an optical image of the deposition layer in the additive joint of FIG. 4.
Figure 6:
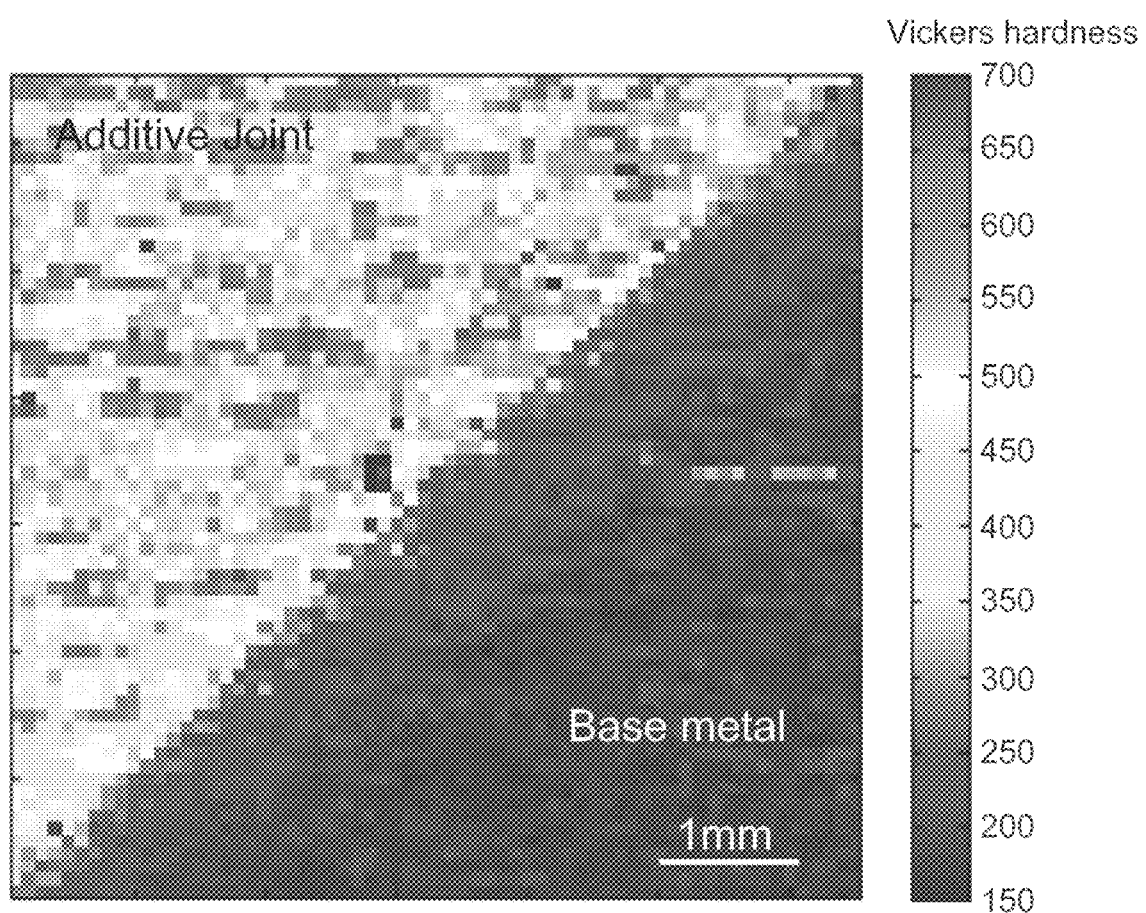
FIG. 6 depicts a hardness map across the boundary of the additive joint and base metal plate of FIG. 4.

A 3.5" long additive joint was successfully fabricated in about 91 minutes of machine time. The fabricated joint is shown in FIG. 4 and, as can be seen from the figure, there was no visible crack or lack of fusion in the sample. FIG. 5 is an optical image taken from the cross section perpendicular to the plane of deposition layers of the joint. The optical image shows the two different materials alternated layer by layer, with each laser pass being about 300×1000 micrometers in dimension. The joint is fully consolidated, with no crack or big inclusion observed at this length scale. FIG. 6 is a hardness map from the same cross section plane and located across the boundaries between the joint and the X52 HSLA steel plate. FIG. 6 shows that the joint is comprised by a hard material with a peak value of 700 Hv and a soft material with 250 Hv. The average hardness of the entire joint is 430 Hv. The transition between the joint and the X52 base metal is very sharp, which indicates a small HAZ.

Figure 7A:
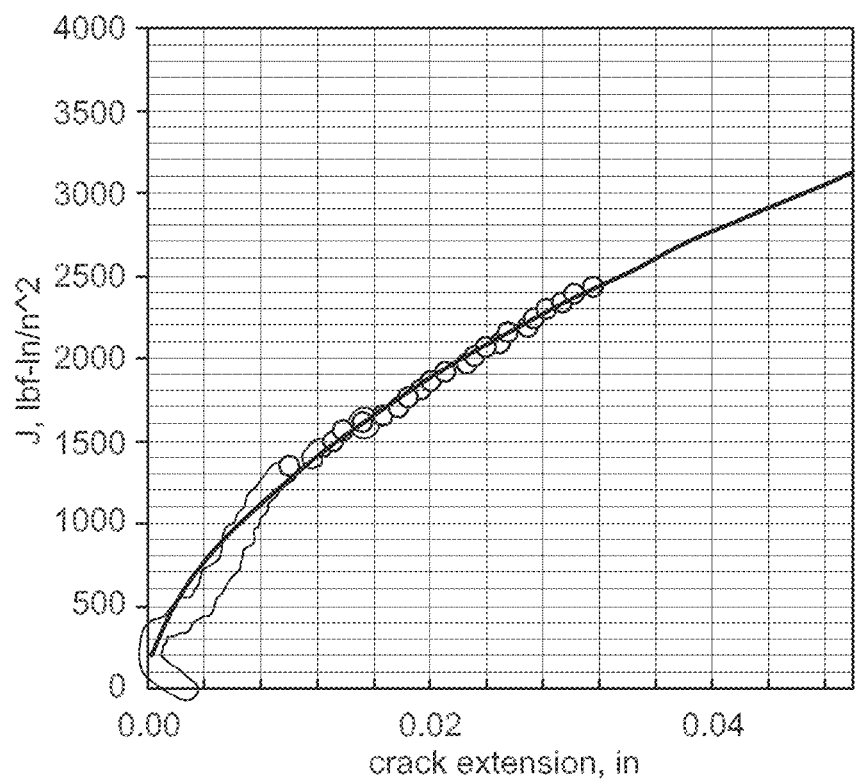
FIG. 7(a) depicts a J-R curve of the HAZ of the additive joint of FIG. 4.
Figure 7B:
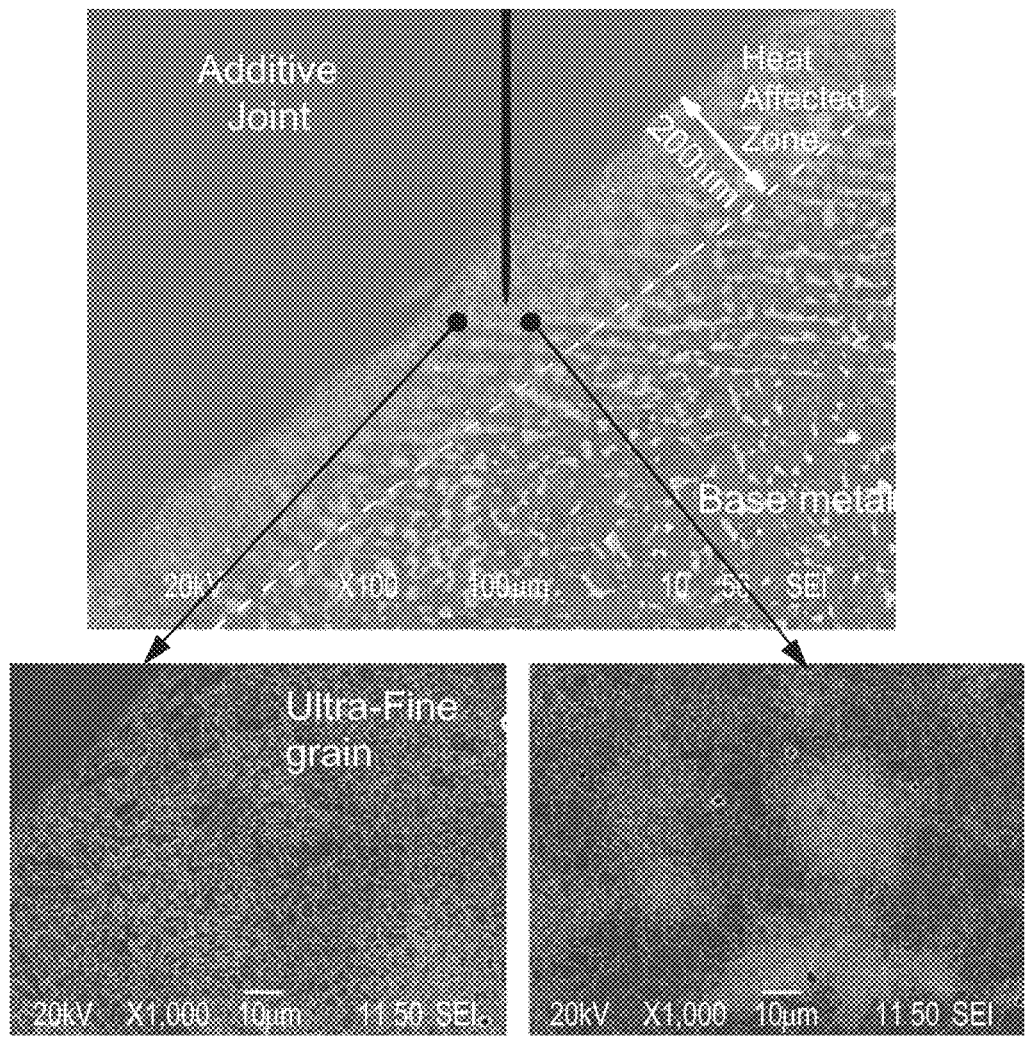
FIG. 7(b) depicts the location of the pre-crack and microstructure of the HAZ of the additive joint of FIG. 4.

Standard ASTM E1820 fracture toughness tests were conducted using three-point bending coupons with pre-cracks located at HAZ or the center of the joint, respectively. FIG. 7a is a J-R curve of the HAZ and FIG. 7b shows the location of pre-crack and HAZ microstructure. The HAZ demonstrated outstanding performance in resisting crack propagation. This is confirmed by the fine microstructure structure of the HAZ, the ferrite grain size being only in the order of 5 micrometer across the entire HAZ.

Figure 8:
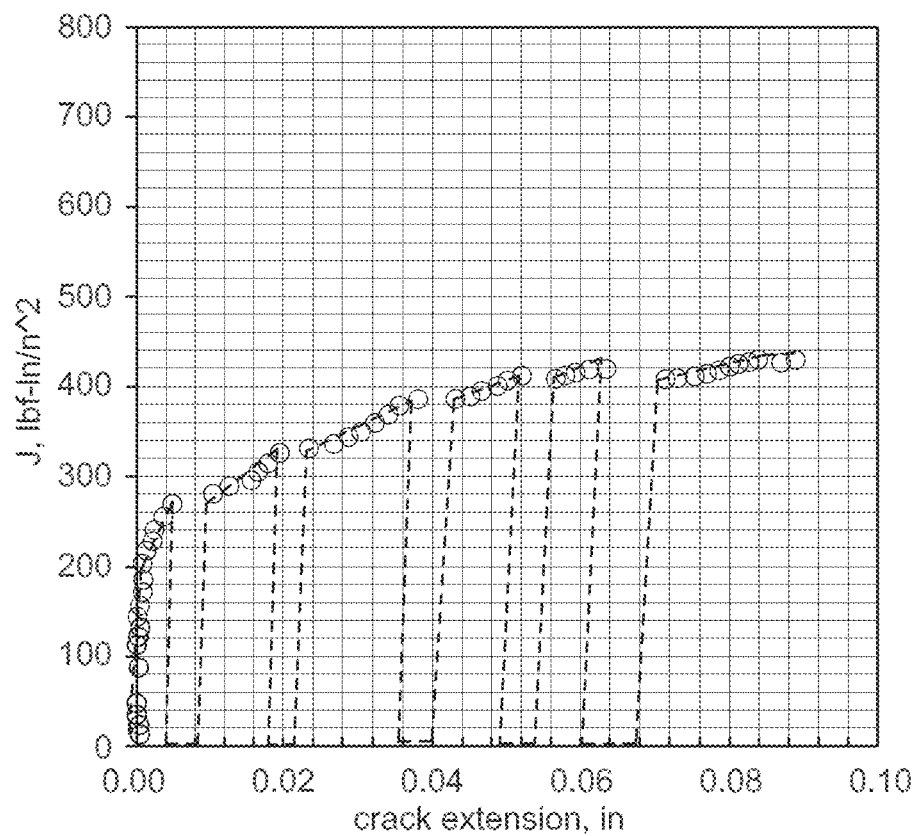
FIG. 8 depicts the J-R curve of the additive joint of FIG. 4.

FIG. 8 is a J-R curve of the composite joint. The curve illustrates a unique discontinuous behavior, as guided by the dashed line. Without being bound by theory, the discontinuity is believed to be caused by the composite nature of the joint. The hard material, H13 tool steel, offers little resistance to crack extension and therefore the J value drops to the level of no reading. On the other hand, the overall toughness of the joint is defined by the performance of the soft material, Type 304L stainless steel. Although the quantitative crack resistance of the joint is much lower than that of the HAZ, it is much better than that of a conventional joint if the average hardness of Type 430 HV steel is considered.

The invention claimed is:

1. An oil, gas and/or petrochemical component comprising:
    two or more adjacent segments comprising plain carbon steel, a cast iron, a low alloy steel, a high carbon steel having a CE equal to or greater than 0.48, a titanium alloy, a nickel based alloy, cobalt based alloy, iron-nickel alloy, duplex stainless steel or combinations thereof;
    laser metal deposition weldments bonding said adjacent segments; and
    optionally a heat affected zone (HAZ) adjacent to said weldments, wherein said HAZ if present has a thickness of 0.001 inches or less.

2. The component of claim 1 wherein the weldments are formed using a metal powder selected from the group consisting of stainless steels, tool steels, nickel alloys, cobalt alloys, titanium alloys, hardfacing or cladding alloys, aluminum alloys, copper alloys, tantalum, tungsten, rhenium, molybdenum alloys functionally graded deposits, ceramics, carbides and combinations thereof.

3. The component of claim 1 chosen from high strength pipelines, steel catenary risers, top tension risers, threaded components, liquefied natural gas containers, pressurized liquefied natural gas containers, deep water oil drill strings, riser/casing joints, and well-head equipment.

4. The component of claim 1 wherein said component is used in natural gas transportation and storage type structures and components.

5. The component of claim 4 wherein said natural gas transportation and storage type structures and components are chosen from pipelines, flow lines, gathering lines, transmission lines, shipping vessels, transferring components, storage tanks, and expansion loops.

6. The component of claim 5 wherein said natural gas is in the form of LNG, CNG, or PLNG.

7. The component of claim 1 wherein said component is used in oil and gas well completion and production structures and components.

8. The component of claim 7 wherein said oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

9. The component of claim 8 wherein said off-shore production structures/components are chosen from jacketed platforms, mobile offshore drilling units, casings, tendons, risers, subsea facilities, semi-submersibles, jack-up rigs, TLPs, DDCVs, compliant towers, FPSO, FSO, ships, and tankers.

10. The component of claim 9 wherein said subsea components are chosen from duplexes, manifold systems, trees and BOPs.

11. The component of claim 1 wherein said component is used in oil and gas refinery and chemical plant structures and components.

12. The component of claim 11 wherein said oil and gas refinery and chemical plant structures and components are chosen from cast iron components, heat exchanger tubes, and low and high temperature process and pressure vessels.

13. The component of claim 12 wherein said low and high temperature process and pressure vessels are chosen from steam cracker tubes, and steam reforming tubes.

* * * * *